United States Patent
Liu et al.

(10) Patent No.: US 8,917,713 B2
(45) Date of Patent: Dec. 23, 2014

(54) METHOD AND SYSTEM FOR MANAGING WIRELESS LINKS IN A COMMUNICATION NETWORK

(75) Inventors: Chunmei Liu, Great Falls, VA (US); Masoud Olfat, Great Falls, VA (US)

(73) Assignee: Clearview IP Holdings LLC, Overland Park, KS (US)

( * ) Notice: Subject to any disclaimer, the term of this patent is extended or adjusted under 35 U.S.C. 154(b) by 641 days.

(21) Appl. No.: 12/835,256

(22) Filed: Jul. 13, 2010

(65) Prior Publication Data

US 2012/0014488 A1  Jan. 19, 2012

(51) Int. Cl.
*H04J 3/06* (2006.01)
*H04W 76/02* (2009.01)
*H04W 56/00* (2009.01)
*H04W 76/06* (2009.01)

(52) U.S. Cl.
CPC ........ *H04W 76/027* (2013.01); *H04W 56/0045* (2013.01); *H04W 76/068* (2013.01)
USPC ........... 370/350; 370/242; 370/311; 370/352; 455/437

(58) Field of Classification Search
USPC ...................................................... 370/350
See application file for complete search history.

(56) References Cited

U.S. PATENT DOCUMENTS

| | | | |
|---|---|---|---|
| 2003/0169725 A1* | 9/2003 | Ahmavaara et al. | 370/352 |
| 2007/0298778 A1* | 12/2007 | Chion et al. | 455/422.1 |
| 2008/0123576 A1* | 5/2008 | Son et al. | 370/311 |
| 2009/0298504 A1* | 12/2009 | Lee et al. | 455/437 |
| 2010/0184446 A1* | 7/2010 | Moon et al. | 455/450 |
| 2010/0260142 A1* | 10/2010 | Jung et al. | 370/331 |
| 2011/0194420 A1* | 8/2011 | Park et al. | 370/242 |

* cited by examiner

*Primary Examiner* — Ayaz Sheikh
*Assistant Examiner* — Hai-Chang Hsiung (57) ABSTRACT

A method of operating a communication system comprises establishing a wireless device release time interval for a wireless device release timer at an access node upon establishing an initial network connection between a wireless device and the access node. An initial synchronization process is performed between the wireless device and the access node. The method continues with the access node sending an unsolicited synchronization message to the wireless device and starting the wireless device release timer. A second synchronization process is performed and upon successful completion of the second synchronization process, a success status synchronization response message is sent by the access node to the wireless device. The access node receives a synchronization confirmation message from the wireless device that comprises an identifier corresponding to the identity of the wireless device and upon receiving the confirmation message, the access node cancels the wireless device release timer.

15 Claims, 9 Drawing Sheets

METHOD AND SYSTEM FOR MANAGING WIRELESS LINKS IN A COMMUNICATION NETWORK

TECHNICAL BACKGROUND

Wireless networks commonly perform multiple processes when establishing communication sessions with wireless devices. These processes may be referred to as network entry processes. One such process is sometimes referred to as a ranging process or random access channel (RACH) process. Ranging between the wireless network and a wireless device allows the wireless device to synchronize the uplink (UL) connection with the network by maintaining timing, frequency and power-levels for the UL connection.

Wireless communication devices commonly communicate at various layers with wireless communication networks. Links established at lower layers allow communications to commence at upper layers. The failure of a lower layer link may cause the failure of upper layer links.

In many cases, wireless links may degrade due to various factors or conditions. For example, the wireless link may experience fading due to the mobility of the wireless device or the over-the-air conditions that exist at a particular point in time. Such a degradation of a wireless link may cause upper layer links, such as a network connection, to fail. In some instances, the network may not know that the link to a particular wireless device has failed and the network may needlessly continue to send data destined for the wireless device, wasting valuable network resources.

One important aspect that affects user experiences and device performance is synchronization. Synchronization between a device and a network reduces delay and latency and improves user experiences. In contrast, when a device is not synchronized with a network, fundamental operations can be inhibited.

OVERVIEW

A method of operating a communication system comprises establishing a wireless device release time interval for a wireless device release timer at an access node upon establishing an initial network connection between a wireless device and the access node. An initial synchronization process is performed between the wireless device and the access node. The method continues with the access node sending an unsolicited synchronization message to the wireless device and starting the wireless device release timer. A second synchronization process is performed and upon successful completion of the second synchronization process, a success status synchronization response message is sent by the access node to the wireless device. The access node receives a synchronization confirmation message from the wireless device that comprises an identifier corresponding to the identity of the wireless device and upon receiving the confirmation message, the access node cancels the wireless device release timer.

Another method of operating a communication system is also provided. A wireless device release time interval for a wireless device release timer at an access node is established upon establishing an initial network connection between a wireless device and the access node. An initial synchronization process is performed between the wireless device and the access node. The method continues with the access node sending an unsolicited synchronization message to the wireless device and starting the wireless device release timer. A second synchronization process is performed and upon unsuccessfully completing the second synchronization process, an abort status synchronization response message is sent by the access node to the wireless device. Access node receives a request for a context for the wireless device by a second access node and cancels the wireless release timer.

Yet another method of operating a communication system is also provided. A wireless device release time interval for a wireless device release timer at an access node is established upon establishing an initial network connection between a wireless device and the access node. An initial synchronization process is performed between the wireless device and the access node. The method continues with the access node sending an unsolicited synchronization message to the wireless device and starting the wireless device release timer. A second synchronization process is performed and upon unsuccessfully completing the second synchronization process, an abort status synchronization response message is sent by the access node to the wireless device. Upon exceeding the wireless device release time interval, a context for the wireless device is released at the access node.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
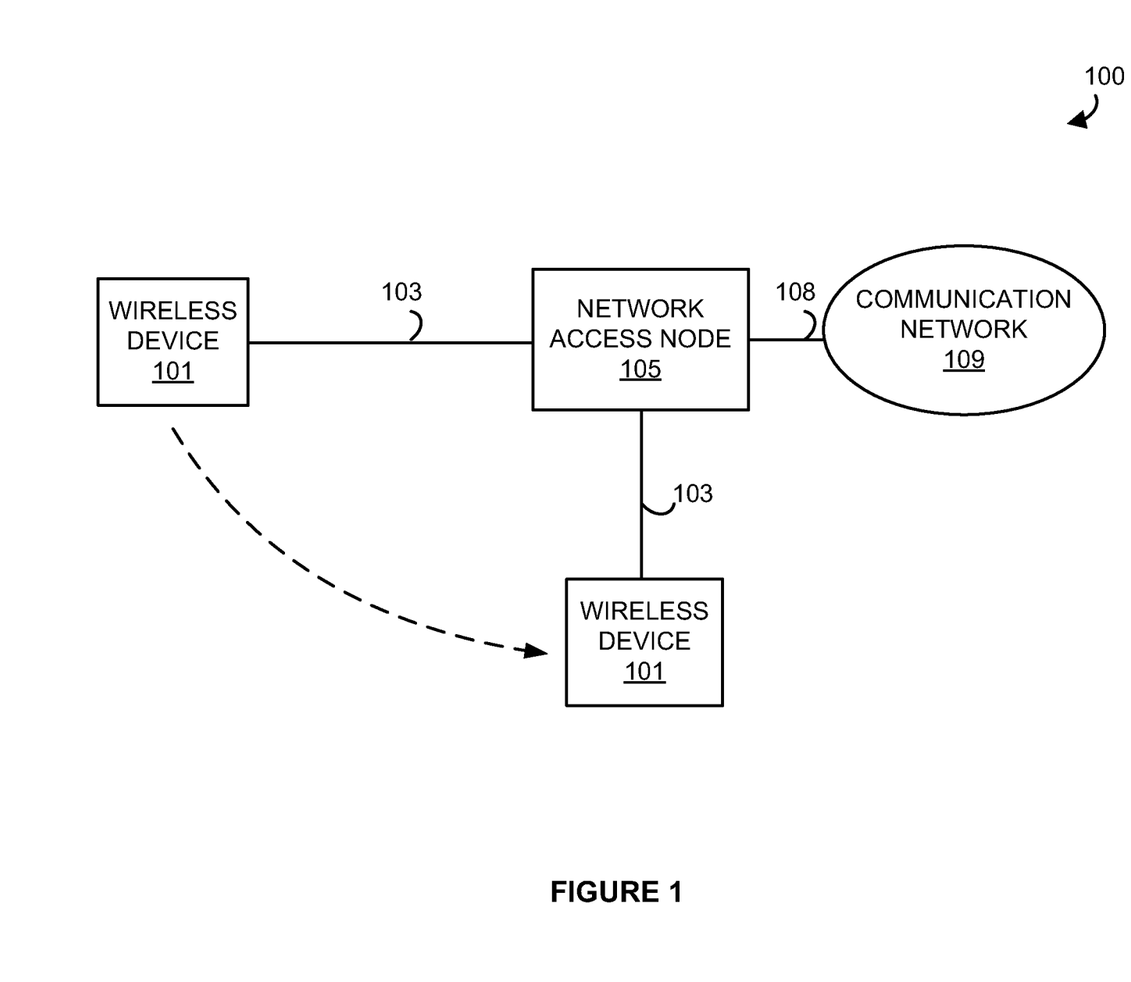
FIG. 1 is a block diagram illustrating a wireless communication system.

FIG. 1 illustrates communication system 100. Communication system 100 includes wireless device 101, network access node 105, and communication network 109. Wireless device 101 and network access node 105 communicate over wireless link 103. Network access node 105 and communication network 109 communicate over communication link 108.

Figure 2A:
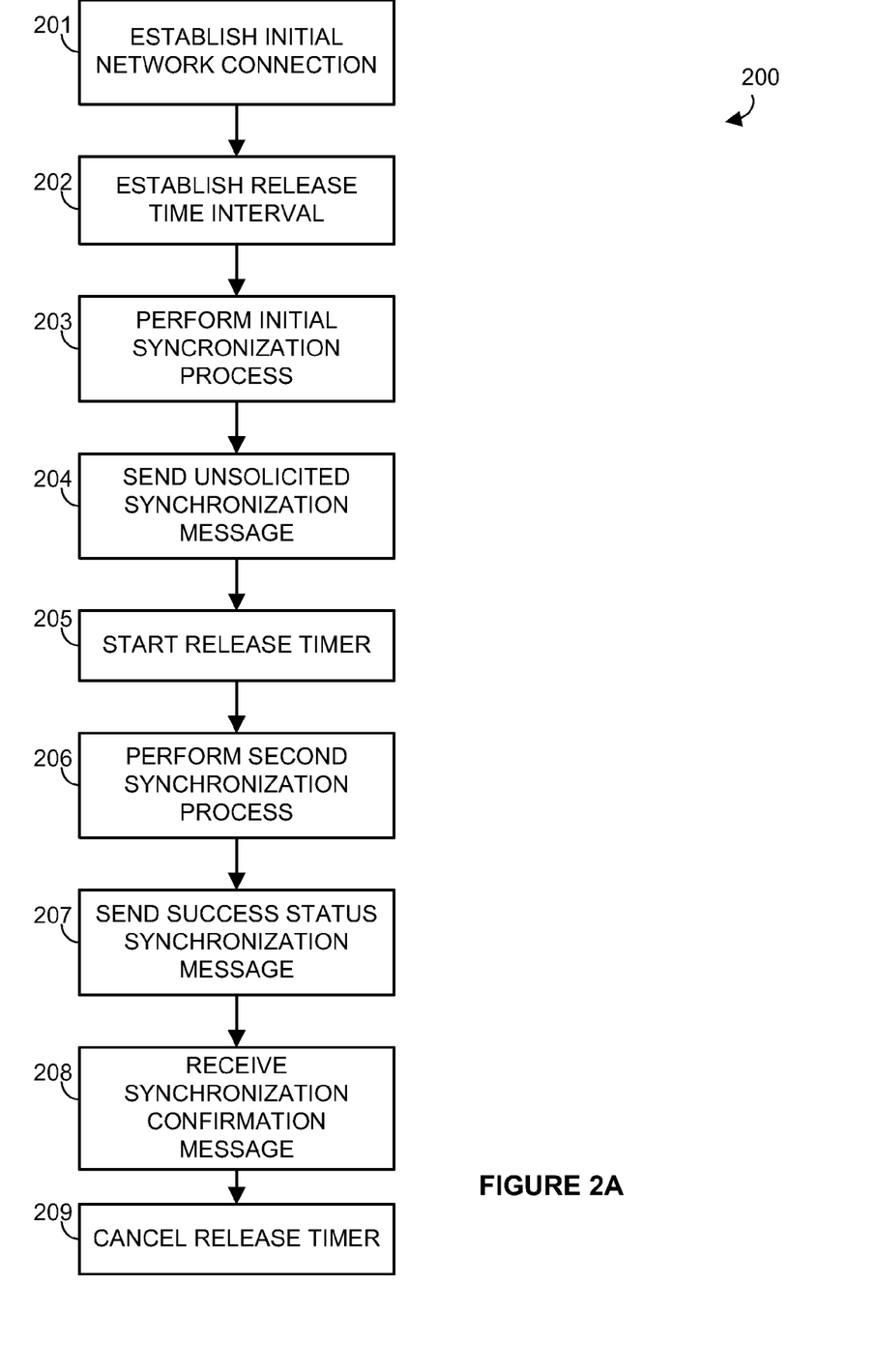
FIG. 2A is a flow diagram illustrating the operation of the wireless communication system.

FIG. 2A illustrates process 200 describing the operation of communication system 100. Wireless device 101 establishes an initial network connection with network access node 105 (Step 201). The initial network connection process may include the wireless device 101 scanning for and synchronizing with available downlink (DL) channels from network access node 105 and obtaining uplink (UL) parameters to begin an initial UL synchronizing process.

During the connection process, network access node 105 establishes a wireless device release time interval for a wireless device timer (Step 202). The wireless device release time interval is set at an initial value that is negotiated during a network entry procedure between wireless device 101 and network access node 105. After establishing the initial network connection, wireless device 101 and network access node 105 perform an initial synchronization process (Step 203). The synchronization process allows wireless device 101 to adjust its UL timing and power control levels with network access node 105 over wireless link 103. In some examples, the UL synchronization process may be referred to as a ranging process or random access channel (RACH) process for establishing initial UL transmissions over wireless link 103.

Communication sessions can then begin between wireless device 101 and communication network 109. While wireless device 101 and network access node 105 exchange communications, network access node 105 may periodically send unsolicited synchronization messages to wireless device 101 (Step 204). Unsolicited synchronization messages may be sent for a number of reasons including, but not limited to, changes in the link conditions of wireless link 103. This allows wireless device 101 to track timing and power-level fluctuations and have network access node 105 make the necessary adjustments.

When network access node 105 sends an unsolicited synchronization message, it starts the wireless device release timer (Step 205). Sending the unsolicited synchronization message also triggers a second UL synchronization process (Step 206). At the completion of a successful synchronization process, network access node 105 send a success status synchronization message (Step 207). Network access node 105 then receives a synchronization confirmation message from wireless device 101 that includes the identity of wireless device 101 (Step 208). Once the wireless device identity is received, network access node 105 cancels the wireless device release timer (Step 209).

Figure 2B:
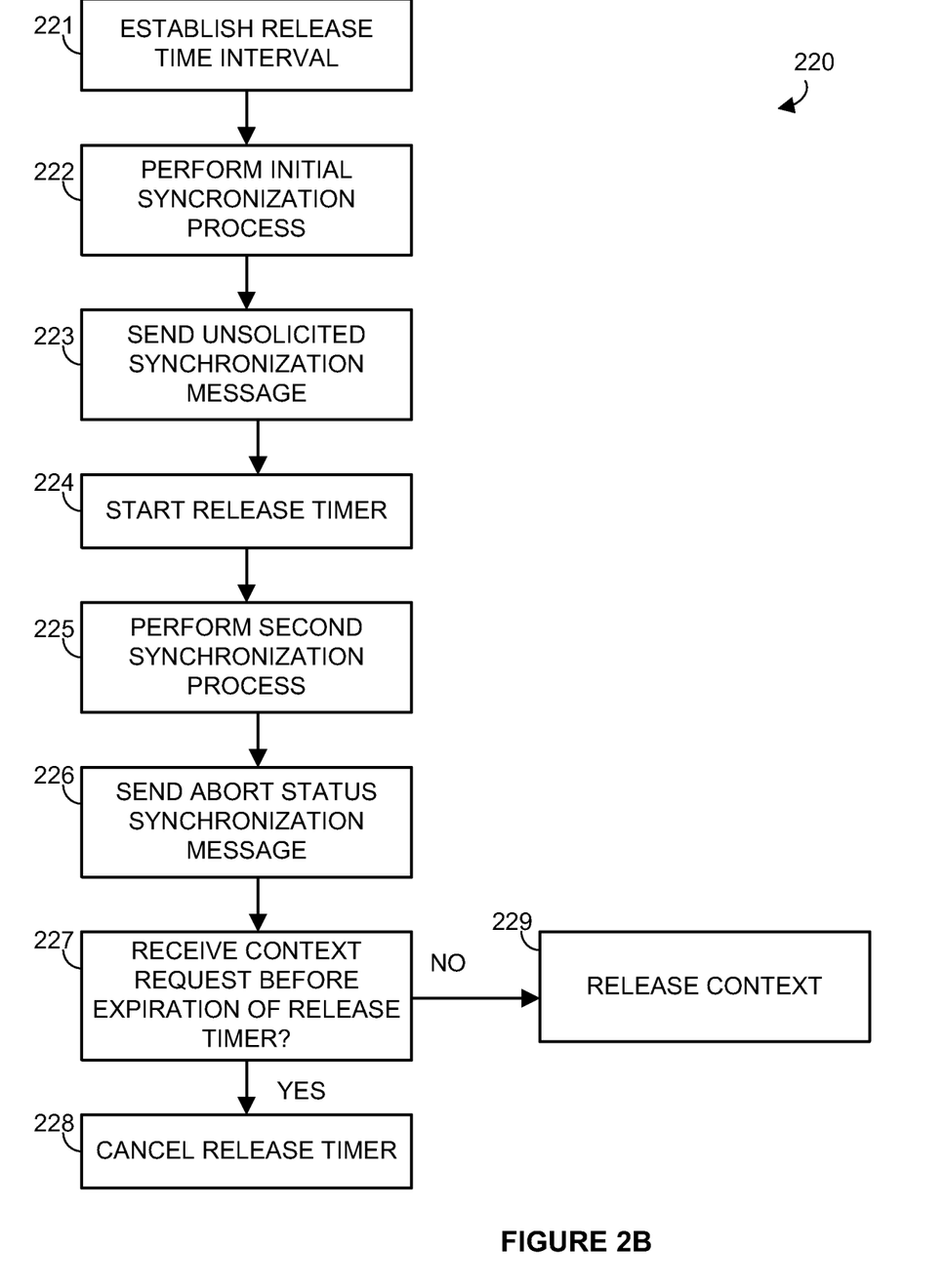
FIG. 2B is a flow diagram illustrating the operation of the wireless communication system.

FIG. 2B illustrates process 220 describing the operation of communication system 100. Network access node 105 establishes a wireless device release time interval for a wireless device timer (Step 221). The wireless device release time interval is set at an initial value that is negotiated during a network entry procedure between wireless device 101 and network access node 105. After establishing the initial network connection, wireless device 101 and network access node 105 perform an initial synchronization process (Step 222). The synchronization process allows wireless device 101 to adjust its UL timing and power control levels with network access node 105 over wireless link 103. In some examples, the UL synchronization process may be referred to as a ranging process or random access channel (RACH) process for establishing initial UL transmissions over wireless link 103.

Communication sessions can then begin between wireless device 101 and communication network 109. While wireless device 101 and network access node 105 exchange communications, network access node 105 may periodically send unsolicited synchronization messages to wireless device 101 (Step 223). Unsolicited synchronization messages may be sent for a number of reasons including, but not limited to, changes in the link conditions of wireless link 103. This allows wireless device 101 to track timing and power-level fluctuations and have network access node 105 make the necessary adjustments.

When network access node 105 sends an unsolicited synchronization message, it starts the wireless device release timer (Step 224). Sending the unsolicited synchronization message also triggers a second UL synchronization process (Step 225). During the second synchronization process, if the link conditions are below a certain level, network access node 105 sends an abort status synchronization message (Step 226). The abort message notifies wireless device 101 to begin searching for another wireless link that may or may not be associated with the current network access node 105. If network access node 105 receives a request for the context information for wireless device 101 from another network access node (not shown) before the expiration of the wireless device release timer, network access node 105 cancels the wireless device release timer and provides the context information to the new serving network access node (Steps 227 & 228). Should network access node 105 not receive a context request before the expiration of the wireless device release timer, network access node 105 releases the context information for wireless device 101 and stops transmitting data to wireless device 101 (Steps 227 & 229).

Referring back to FIG. 1, wireless device 101 is any device capable of communicating wirelessly with network access node 105. Wireless device 101 comprises communication interface and processing elements configured to operate as described herein for wireless device 101. Communication interface elements may include an antenna (or antennas) coupled to Radio Frequency (RF) communication circuitry that processes RF signals received over the antenna. The RF communication circuitry typically includes at least an amplifier, filter, modulator, and signal processing circuitry. Wireless device 101 may also include a user interface, memory device, software, processing circuitry, or some other communication components. Wireless communication device 101 may be a phone, computer, e-book, mobile Internet appliance, wireless network interface card, media player, game console, or some other wireless communication apparatus—including variations or combinations thereof.

Network access node 105 comprises RF communication circuitry and an antenna. The RF communication circuitry typically includes an amplifier, filter, RF modulator, and signal processing circuitry. Network access node 105 may also comprise a router, server, memory device, software, processing circuitry, cabling, power supply, network communication interface, structural support, or some other communication apparatus. Network access node 105 could be a base station, Internet access node, telephony service node, wireless data access point, or some other wireless communication system—including variations or combinations thereof.

Communication network 109 comprises any network or collection of networks capable of communicating with network access node 105 over communication link 108. Examples of communication network 109 include a Wide Area Network (WAN), Local Area Network (LAN), internet, intranet, public switch telephone network (PSTN), wireless communication network, cable multi-service operator (MSO) network, or any combination or variation thereof.

Wireless link 103 uses the air or space as the transport media. Wireless link 103 may use various protocols, such as Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), or some other wireless communication format.

Communication link 108 uses metal, glass, air, space, or some other material as the transport media. Communication link 108 could use various communication protocols, such as Time Division Multiplex (TDM), Internet Protocol (IP), Ethernet, communication signaling, CDMA, EVDO, WiMAX, GSM, LTE, WIFI, HSPA, or some other communication format—including combinations thereof. Communication link 108 could be a direct link or may include intermediate networks, systems, or devices.

In operation, a user operates wireless communication device 101 to establish communication sessions between wireless device 101 and communication network 109. For example, a user may operate wireless device 101 to place a phone call, check an email account, browse the Internet, or otherwise communicate with a destination via communication network 109.

In order to exchange communications in this manner, wireless communication device 101 first establishes wireless link 103 with network access system 105. Upon establishing wireless link 103, wireless device 101 performs a network entry process to establish an initial network connection with communication network 109. The network entry process may comprise several steps, at the completion of which wireless device 101 is able to exchange communications with communication network 109.

At times, the quality of wireless link 103 may vary. For example, the signal strength of wireless link 103 as measured by wireless device 101 may increase or decrease due to a variety of factors. Fluctuations in signal strength may occur because of mobility of wireless device 101, fast fading, shadow fading, or combinations of these factors. In fact, the quality of wireless link 103 may suffer so greatly that wireless link 103 is dropped, thereby inhibiting wireless device 101 from exchanging communication sessions over the network connection with communication network 109.

Referring to FIG. 1 once again, an example is illustrated showing a possible scenario for network access node 105 and wireless device 101 to have an unsuccessful ranging procedure due to link degradation of link 103 because of the mobile nature of wireless device 101. As wireless device 101 moves from one geographic location to another (as illustrated by the dotted line), link 103 experiences a degradation in signal quality. When network access node 105 detects this situation, it sends an unsolicited synchronization message to request that wireless device 101 to perform an UL synchronization process. Should link 103 degrade below a certain threshold, network access node sends an abort status synchronization message wireless device 101. When wireless device 101 receives the abort message, it begins a procedure to reinitialize its MAC parameters and may possibly begin to seek out another network access node.

In this example, wireless device 101 detects another network access node and network access node awaits a request to send wireless device 101's context information. Network access node 105 receives the request for wireless device 101's context before the expiration of the release timer and provides the context information to the network. Network access node 105 has this ability to provide wireless device 101's context because it has the identity of wireless device 101 from the synchronization confirmation message from the prior synchronization procedure.

As in other communication systems, state synchronization among different entities in wireless communication systems is important for proper system operations, including state synchronization between a wireless device and a wireless network.

State synchronization means that state information, including the wireless device's operation mode (e.g. active mode or idle mode) as well as context associated with the wireless device, is retained at both ends. Retaining this context information is important because a wireless network's operating behavior towards a wireless device (and vice versa) would be different depending on the knowledge of the overall connection state between them, such as radio link state, whether the device is in idle mode or sleep mode or active mode, and so on. For example, when the wireless device is in idle mode and there is incoming data for the wireless device, the network will page the wireless device. In contrast, when the wireless device is in active mode, the network will simply send packets to the wireless device. Hence, it is essential for the device and the network to maintain and synchronize state information, so that the device and the network can at all times be aware of each other's state.

Improved synchronization between the wireless device and the network will avoid many problems. For example, due to lack of synchronization and knowledge of the identity of the wireless device by the network, when a wireless device experiences a degradation of service over the wireless link, the network may continue to send data destined for the wireless device wasting valuable network resources.

Disclosed herein are mechanisms to provide a wireless network with the identity of the wireless device during initial uplink synchronization and to establish a wireless device release timer at the network access node. This will allow the network to maintain and synchronize state information between the wireless device and network to improve network operations and performance.

Figure 3:
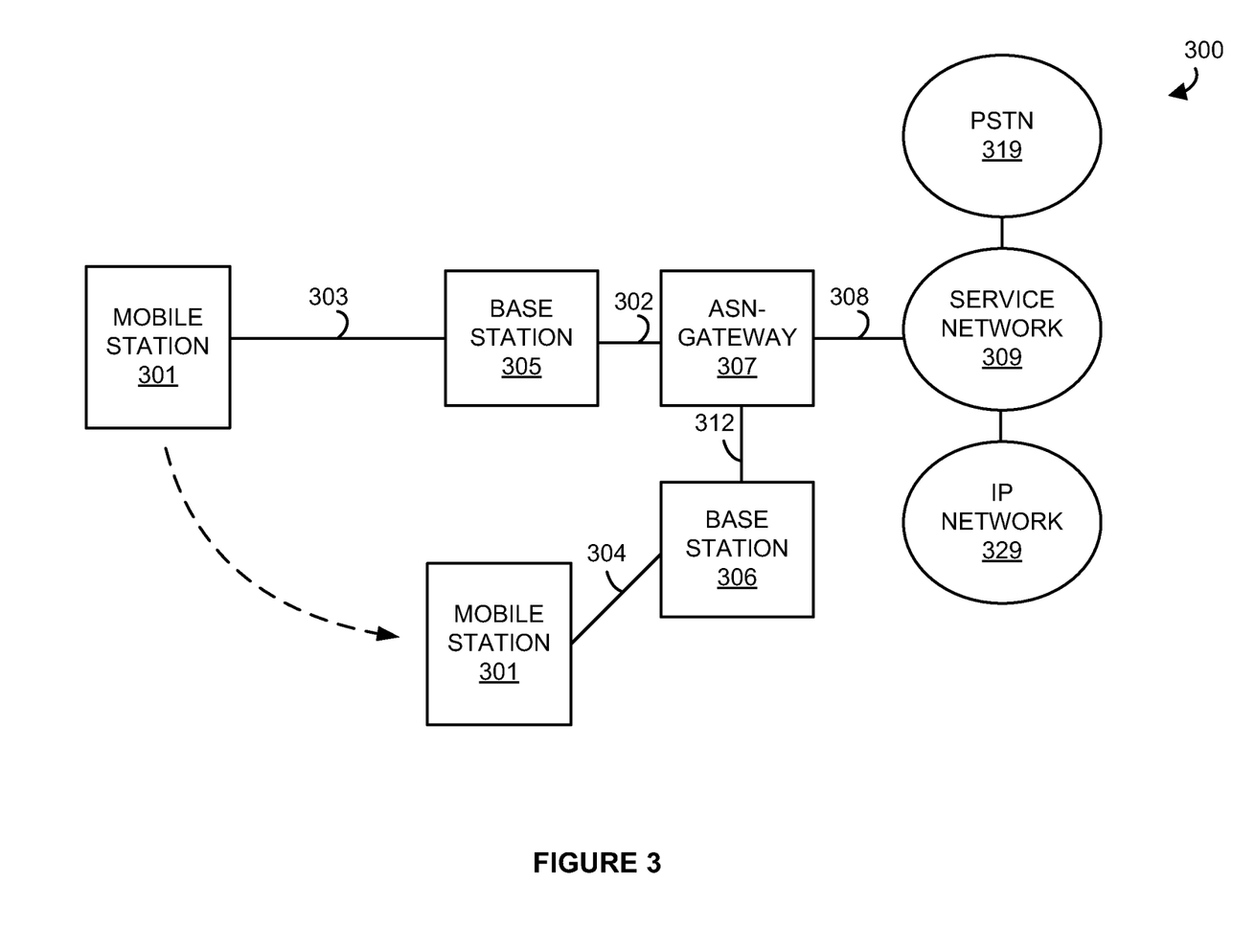
FIG. 3 is a block diagram illustrating a wireless communication system.

FIG. 3 illustrates a network architecture suitable for the WiMAX wireless interface protocol. However, it should be understood that other wireless protocols could be used, as well as other network architectures. Examples of other suitable wireless protocols include WCDMA, CDMA2000, CDMA, EVDO, GSM, LTE, WIFI, and HSPA, as well as other variations and combinations thereof.

Continuing with FIG. 3, communication system 300 is illustrated and includes wireless communication device (wireless device) 301, base station 305, base station 306, access service network (ASN) gateway 307, service network 309, public switched telephone network 319, and Internet Protocol (IP) network 329.

Mobile station 301 and base station 305 communicate over wireless link 303. Base station 305 and access gateway 307 communicate over link 302. Base station system 306 and access gateway system 307 communication over link 312. Access gateway system 307 and communication network 309 communicate over communication link 308.

Mobile station 301 comprises any device capable of communicating with service network 309 and thus, with PSTN 319 and IP network 329 over a wireless interface with base station systems 305 and 306 over an air interface. Mobile phones, portable computers, mobile media devices, and network interface cards are examples of such devices. Mobile station 301 may sometimes be referred to as a mobile station (MS).

Base stations 305 and 306 provide the wireless interface to mobile station 301, over which mobile station 301 exchanges communications with service network 309. Base stations 305 and 306 provide functions such as mobility management, hand off provisioning and control, radio resource management, quality of service enforcement, and session management, as well as other functions.

ASN gateway 307 provides a traffic aggregation point for base stations 305 and 306. Additional functions may include location management and paging, radio resource management and admission control, subscriber profile management, AAA functionality, and quality of service provisioning and management.

Service network 309 provides mobile station 301 with connectivity to IP network 319, and connectivity to PSTN 319. It should be understood that service network 309 could provide connectivity to other networks as well, such as a 3GPP/3GPP2 network, an intranet, LAN, WAN, public networks, corporate networks, or the like. Service network 309 may include elements such as AAA servers that provide authentication and authorization services to devices, such as mobile station 301. Service network 309 handles IP address management, roaming support, location management, and interworking of communications to formats suitable for other networks, such as PSTN 319.

It should be understood that any of the functions described as pertaining to base stations 305 and 306, ASN gateway 307, or service network 309 could reside in or be performed by any of those elements. In addition, the elements themselves could be combined or otherwise contained within each other. For example, ASN gateway could be contained in or combined with at least one of base stations 305 and 306.

Figure 4:
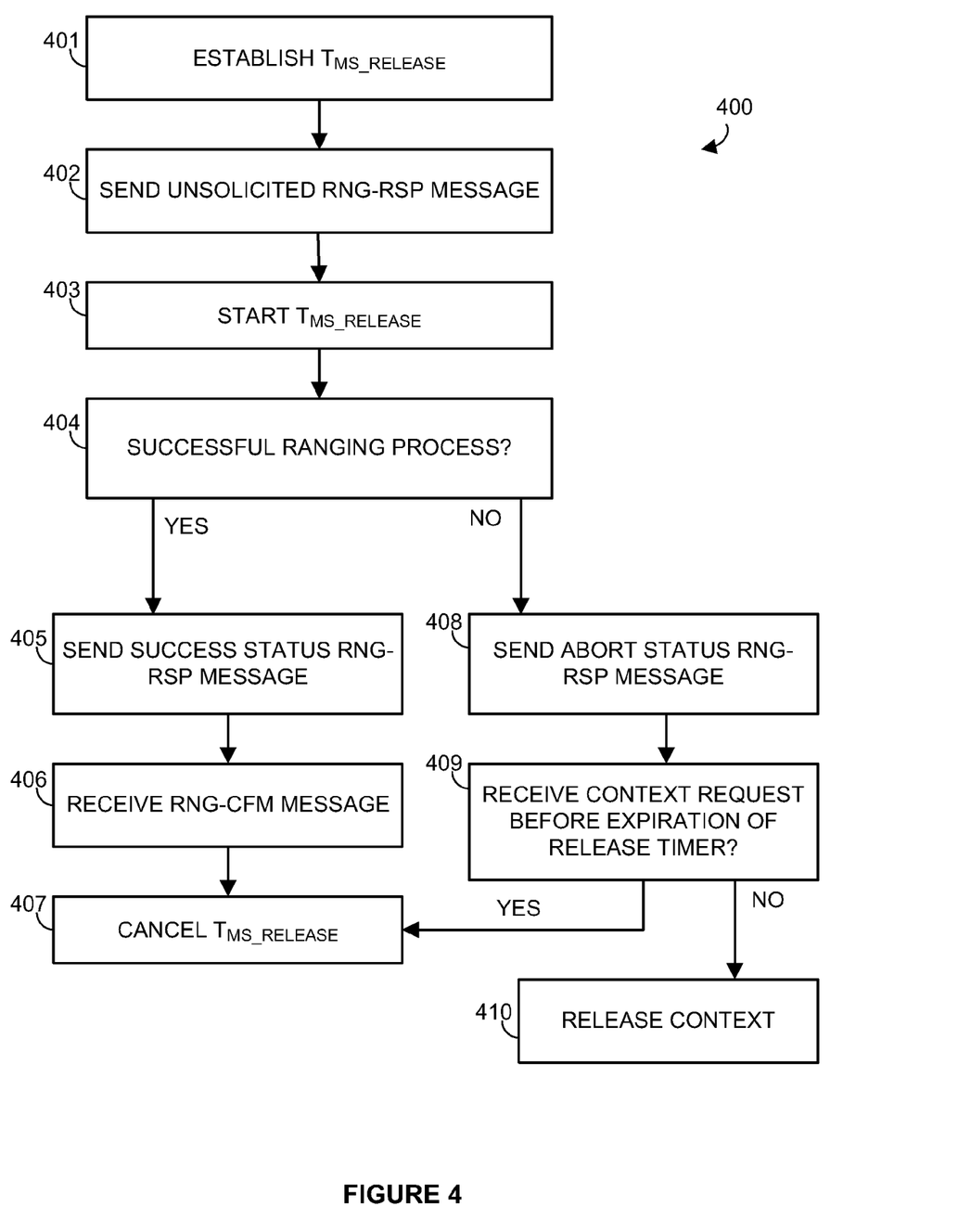
FIG. 4 is a flow diagram illustrating the operation of the wireless communication system.

FIG. 4 is a flow diagram illustrating process 400 that describes the operation of communication system 300 to improve synchronization between mobile stations and base stations. In particular, process 400 provides an example for establishing a release timer ($T_{MS\_RELEASE}$) and for mobile station 301 to provide its identification to its serving base station (base station 305 or 306). Timer $T_{MS\_RELEASE}$, is maintained by the serving base station (in this example, base station 305) and is configured and negotiated during an initial network entry process. $T_{MS\_RELEASE}$ may also be reconfigured or modified during a later ranging process between mobile station 301 and base station 305.

Referring again to FIG. 3, mobile station 301 has established wireless connection 303 with base station system 305. Wireless connection 303 may be considered a layer 1, or physical layer link. Likewise, mobile station 301 has established a network connection with service network 309 by performing a full network entry process. The full network entry process may include steps such as scanning for downlink channels, synchronizing with the downlink of a serving base station, obtaining uplink parameters, ranging, negotiating basic capabilities, authorization and key exchange, network registration, obtaining an IP address, obtaining time of day, transferring operational parameters, and establishing provisioned parameters. It should be understood that some steps could be omitted and other, different steps included in a full network entry process.

Mobile station 301 is initially located in a geographic area and exchanges communications over the network connection. The network connection may be considered an upper layer link relative to layer 1 link wireless connection 303. For example, the network connection may be a layer 2 or layer 3 connection.

The communications are exchanged using context information that identifies the network connection. Examples of context information include internet protocol (IP) addresses, media access control (MAC) identifiers, and the like. Establishing the network connection can be referred to as "entering" a service network that provides mobile station 301 with access service. The access service allows mobile station 301 to communicate over service network 309 with destinations in PSTN 319 or IP network 329. For example, a user operating mobile station 301 may place phone calls, browse the worldwide web, check email, or otherwise utilize voice, video, media, or data services provided by service network 309.

Referring now to FIG. 4, during the initial network entry process by mobile station 301, base station 305 establishes a time interval, $T_{MS\_RELEASE}$, for a mobile device release timer (Step 401). The initial value of the $T_{MS\_RELEASE}$ is negotiated during the initial network entry process and can be modified later, based upon the length of a typical ranging procedure between mobile station 301 and base station 305. When negotiating the value for $T_{MS\_RELEASE}$, the system also takes into account the estimated time for base station 305 to receive a request for mobile station 301's context information from another base station, such as base station 306 in this example via links 302 and 312.

Ranging is a UL synchronization process utilized in WiMAX and CDMA. Typically, mobile station 301 will initiate the ranging process at the request of base station 305. Initial ranging allows mobile station 301 to obtain the relative timing, frequency, and power-level adjustment required to maintain the UL link with base station 305. Because the quality of wireless link 303 fluctuates, base station 305 will monitor link 303 by periodically performing ranging. As stated above, fluctuations with link 305 may be caused by the mobility of mobile station 301, fast fading, shadow fading, or combinations of these factors. Base station 305 may modify the value of $T_{MS\_RELEASE}$ after a successful ranging process based upon the time it took for mobile station 301 to complete the ranging process with base station 305. As discussed above, the value for $T_{MS\_RELEASE}$ is also set based upon the time it may take for base station 305 to receive a request for mobile station 305's context information from another base station after mobile station 301 transitions to the other base station.

After a successful ranging process is completed, base station 305 will send an unsolicited (ranging response) RNG-RSP message when link conditions fluctuate or fall below a certain threshold that initiates another ranging procedure (Step 402). At this time, base station 305 starts timer, $T_{MS\_RELEASE}$ (Step 403).

If this ranging procedure is successfully completed (Step 404), base station 305 sends a RNG-RSP success status message to mobile station 301 (Step 405). Upon receiving this success message, mobile station 301 sends a ranging confirmation (RNG-CFM) message that confirms the successful ranging process and returns the identity of the mobile station 301 to base station 305 (Step 405). Base station 305 receives the RNG-CFM message and cancels timer, $T_{MS\_RELEASE}$ (Step 406). It should be noted that mobile station 301 may provide its identity using existing message protocols by inserting its identity into existing messaging streams between it and base station 305.

During the ranging procedure, base station 305 assigns a connection identifier (CID) for each service flow with mobile station 301 that serves as a temporary address for data transmissions. Thus, multiple CIDs may exist between base station 305 and mobile station 301. Now that base station 305 also has the identity of mobile station 301 using the RNG-CFM message, base station 305 can now efficiently manage the synchronization of link 303. Base station 305 having the identity of mobile station 301 can now have knowledge of the particular ranging results for that mobile station. This allows base station 305 to efficiently solve synchronization and link fluctuation issues that caused the initiation of the ranging procedure. For example, if the link conditions deteriorate, base station 305 would initiate a ranging procedure by sending an unsolicited RNG-RSP message to mobile station 301. Base station 305 may not be aware if the ranging process failed and may continue to send downlink packets scheduled for mobile station 301 if it does not have mobile station 301's identity that it obtained using the RNG-CFM message.

In particular, when base station 305 receives UL traffic from mobile station 301 and the signal quality using link 303 begins to fluctuate or degrade, base station 305 sends an unsolicited RNG-RSP message to request that mobile station 301 to perform ranging. Should link 303 degrade below a certain threshold, base station 305 sends a RNG-RSP with the status as abort to mobile station 301. When mobile station 301 receives the abort message, it begins a procedure to reinitialize MAC parameters and may possibly begin to seek out another base station. The knowledge of the identity of mobile station 301 by base station 305 prevents severe state mismatch issues between mobile station 301 and base station 305. For example, base station 305 will now know to stop sending DL packets to mobile station 301 because mobile station 301 may have already been transitioned to another serving base station.

Returning to FIG. 4, in the event of an unsuccessful ranging procedure (Step 404), base station 305 sends a RNG-RSP abort status message to mobile station 301 (Step 408). Base station 305 awaits a context request from another base station (or a network element that is part of communication system 300) that could now be serving mobile device 301. Should base station 305 receive a request for mobile station 301's context prior to the expiration of $T_{MS\_RELEASE}$, base station 305 cancels $T_{MS\_RELEASE}$ and provides mobile station 301's context to the network (Steps 409 & 407).

If timer $T_{MS\_RELEASE}$ expires before receiving a request for mobile station 301's context, then base station 305 assumes that the ranging procedure failed and that link 303 is no longer available. As such, base station 305 ceases transmitting DL packets destined for mobile station 301 and releases its context information (Steps 409 & 410).

Referring to FIG. 3 once again, an example is illustrated showing a possible scenario for base station 305 and mobile station 301 for having an unsuccessful ranging procedure due to link degradation of link 303 because of the mobile nature of mobile station 301. As mobile station 301 moves from one geographic location to another (as illustrated by the dotted line), link 303 experiences a degradation in signal quality. When base station 305 detects this situation, it sends an unsolicited RNG-RSP message to request that mobile station 301 to perform ranging. Should link 303 degrade below a certain threshold, base station 305 sends a RNG-RSP with the status as abort to mobile station 301. When mobile station 301 receives the abort message, it begins a procedure to reinitialize MAC parameters and may possibly begin to seek out another base station. In this example, mobile station 301 detects base station 306 via link 304. Base station 306 begins the network initiation process with mobile station 301 and requests the context for mobile station 301 from the network. Base station 305 receives the request for mobile station 301's context before the expiration of timer $T_{MS\_RELEASE}$ and provides the context information to the network.

Figure 5:
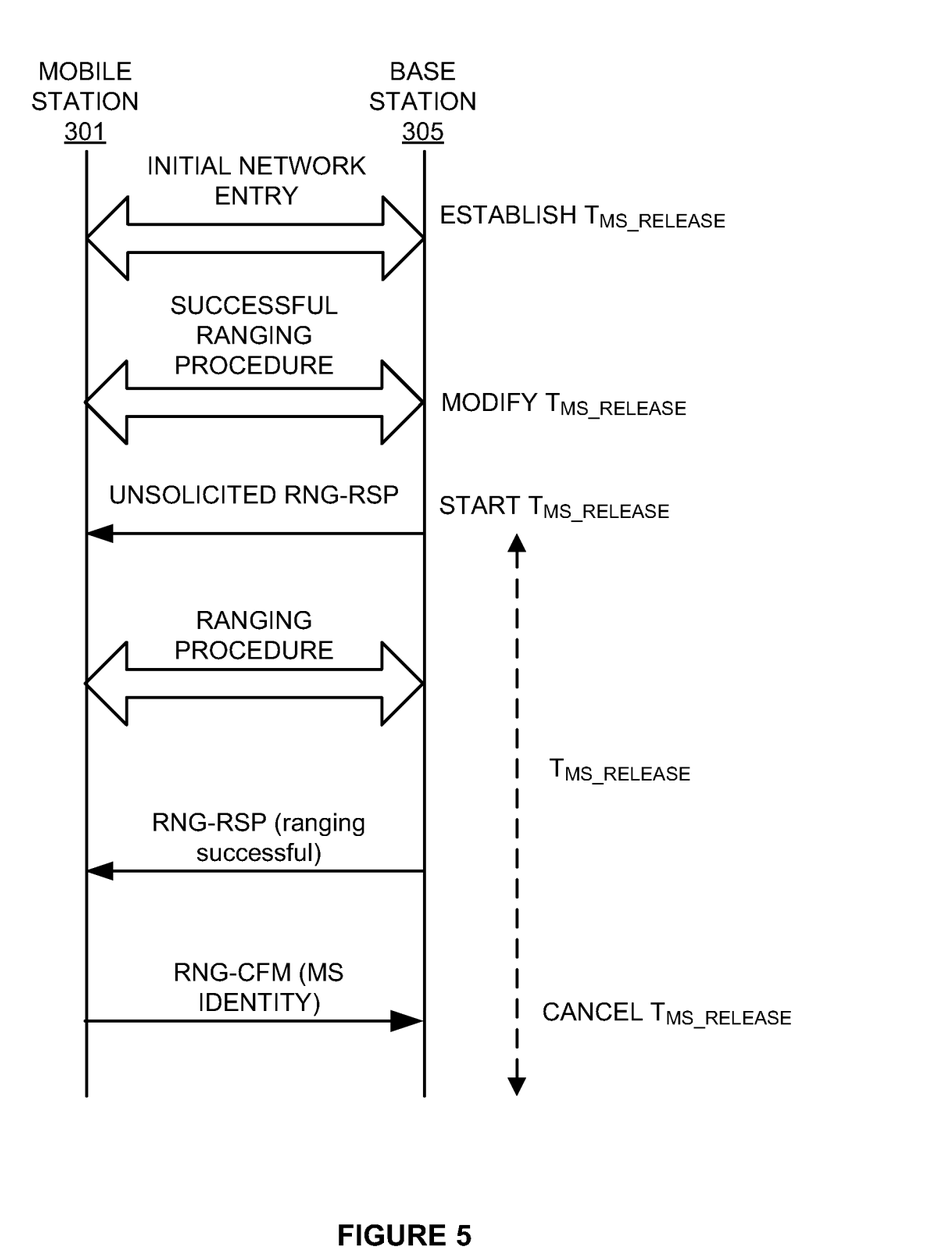
FIG. 5 illustrates an operational flow diagram.

FIG. 5 is an operational flow diagram further illustrating the operation of communication system 300. In FIG. 5, an example is provided where mobile station 301 and base station 305 complete a successful ranging operation and mobile station 301 provides its identity to base station 305 using a RNG-CFM message.

Upon initial network entry, mobile station 301 and base station 305 negotiate and establish release timer, $T_{MS\_RELEASE}$. Following a successful ranging procedure, $T_{MS\_RELEASE}$ can be modified based upon the duration of the ranging procedure and an estimate of the duration for base station 305 to receive a request for mobile station 301's context information from the network. When certain conditions arise with the wireless link between mobile station 301 and base station 305, base station 305 sends an unsolicited RNG-RSP message to mobile station 301. Conditions that may trigger this message include fluctuations in the air quality of the wireless link that comprise signal quality, mobility of the mobile station and other effects described above.

The unsolicited RNG-RSP triggers the ranging procedure. If the procedure is successful, base station 305 sends a RNG-RSP success status message to mobile station 301. Mobile station 301 also sends a RNG-CFM message to base station 305 that includes the identity of mobile station 301. Upon receipt of the RNG-CFM message, base station 305 cancels timer $T_{MS\_RELEASE}$.

Figure 6:
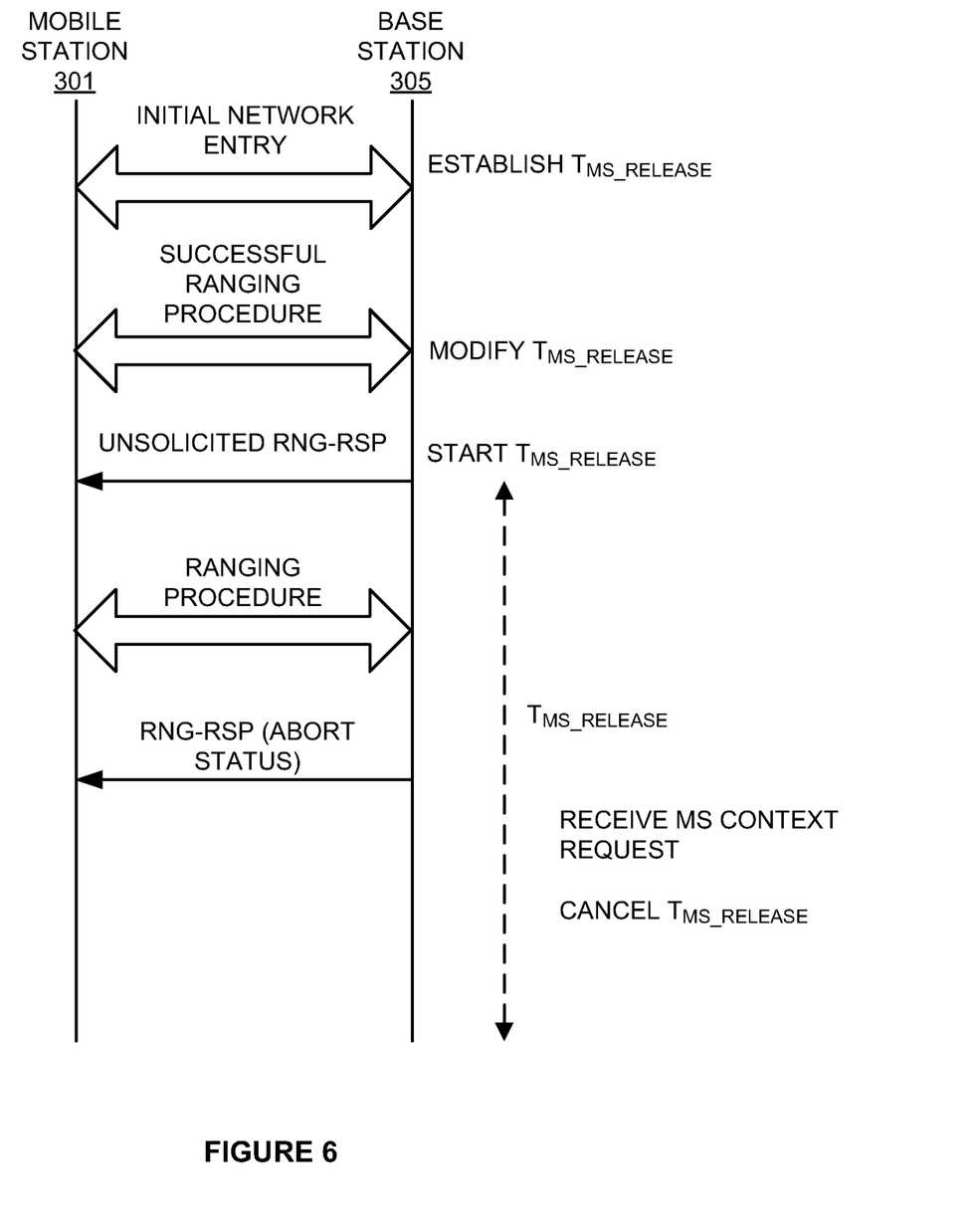
FIG. 6 illustrates an operational flow diagram.

FIG. 6 is another operational flow diagram further illustrating the operation of communication system 300. In FIG. 6, an example is provided where mobile station 301 and base station 305 fail to complete a successful ranging operation and base station 305 receives a context request prior to the expiration of release timer $T_{MS\_RELEASE}$.

As described above with FIG. 5, mobile station 301 and base station 305 negotiate and establish release timer, $T_{MS\_RELEASE}$, and can modify $T_{MS\_RELEASE}$ following a successful ranging procedure. When the wireless link between mobile station 301 and base station 305 degrades below a certain threshold, base station 305 sends an unsolicited RNG-RSP message to mobile station 301.

The unsolicited RNG-RSP triggers the ranging procedure. If the procedure is unsuccessful, base station 305 sends a RNG-RSP abort status message to mobile station 301. Mobile station 301 reinitializes its MAC and attempt a handover procedure to another base station (not shown). Base station 305 receives a request for mobile station 301's context information via the network backbone from the new serving base station. Upon receipt of this request, base station 305 cancels release timer $T_{MS\_RELEASE}$.

Figure 7:
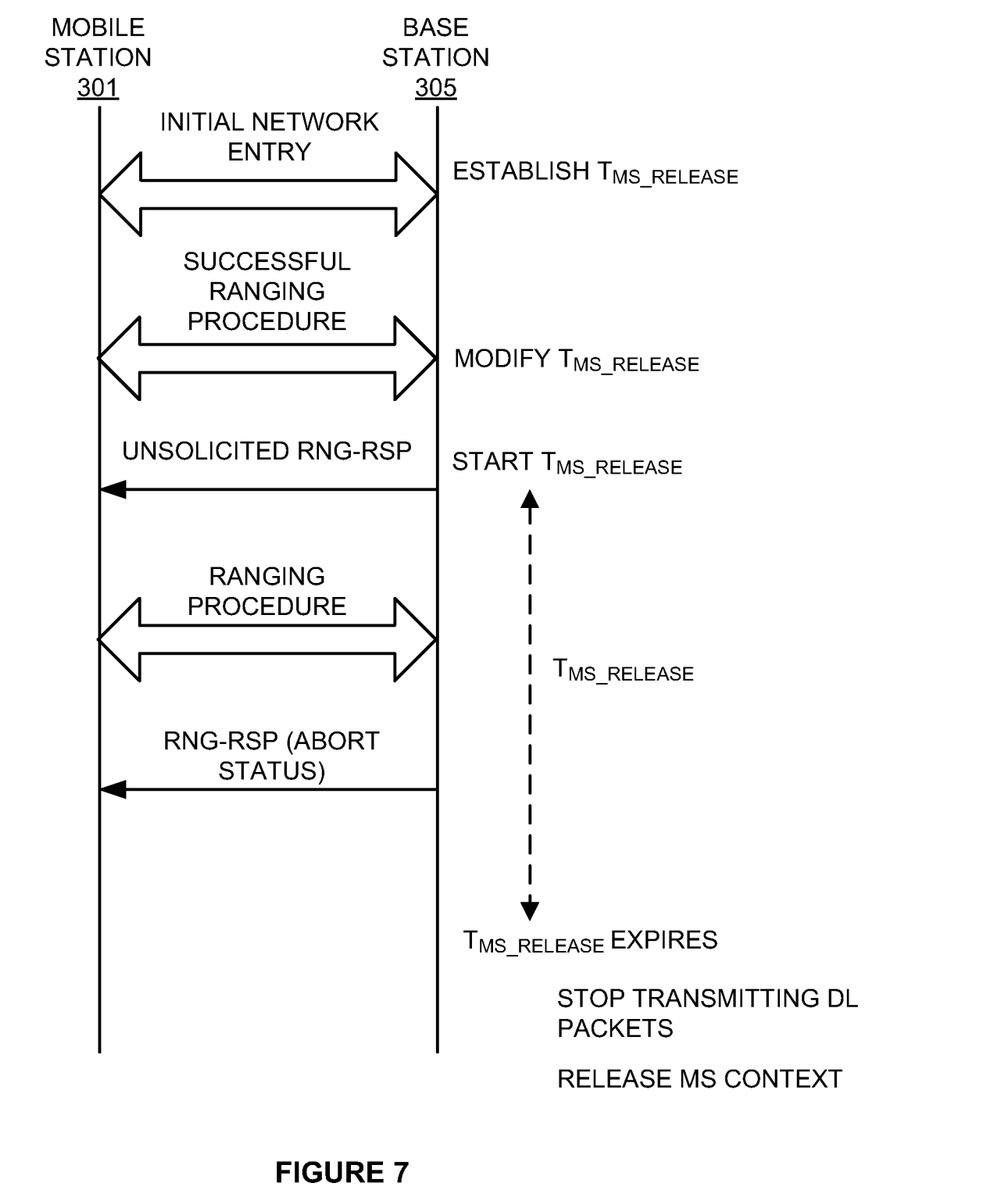
FIG. 7 illustrates an operational flow diagram.

FIG. 7 is another operational flow diagram further illustrating the operation of communication system 300. In FIG. 7, an example is provided where mobile station 301 and base station 305 fail to complete a successful ranging operation and base station 305 fails to receive a context request prior to the expiration of release timer $T_{MS\_RELEASE}$.

As described above with FIG. 5, mobile station 301 and base station 305 negotiate and establish release timer, $T_{MS\_RELEASE}$, and can modify $T_{MS\_RELEASE}$ following a successful ranging procedure. When the wireless link between mobile station 301 and base station 305 degrades below a certain threshold, base station 305 sends an unsolicited RNG-RSP message to mobile station 301.

The unsolicited RNG-RSP triggers the ranging procedure. If the procedure is unsuccessful, base station 305 sends a RNG-RSP abort status message to mobile station 301. Mobile station 301 reinitializes its MAC and attempt a handover procedure to another base station (not shown). When $T_{MS\_RELEASE}$ expires, base station 305 assumes that the ranging procedure failed and the wireless link is no longer available. Base station 305 stops transmitting DL data destined for mobile station 301 and releases mobile station 301's context.

Figure 8:
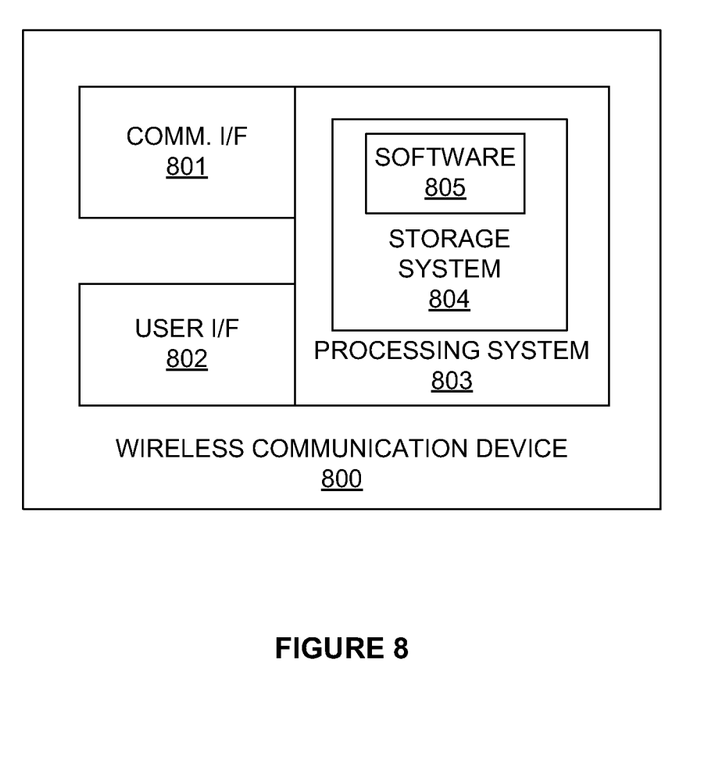
FIG. 8 is a block diagram illustrating a communication control device.

FIG. 8 illustrates communication control system 800. Communication control system 800 may be an example of one or more components of network access node 105, base stations 305 & 306, and ASN-Gateway 307, although these devices may use alternative configurations. Communication control system 800 comprises communication interface 801, user interface 802, and processing system 803. Processing system 803 is linked to communication interface 801 and user interface 802. Processing system 803 includes storage system 804 that stores software 805.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing system 803 may comprise a microprocessor and other circuitry that retrieves and executes software 805 from storage system 804. Storage system 804 may comprise a disk drive, flash drive, data storage circuitry, or some other memory apparatus. Software 805 comprises computer programs, firmware, or some other form of machine-readable processing instructions. Software 805 may include an operating system, utilities, drivers, network interfaces, applications, or some other type of software. When executed by processing system 803, software 805 directs processing system 803 to operate communication control system 800 as described with respect to FIGS. 1-7.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    establishing a wireless device release time interval for a wireless device release timer at an access node upon establishing an initial network connection between a wireless device and the access node, wherein the wireless device release timer is indicative of storing context information of the wireless device at the access node;
    performing an initial synchronization process between the wireless device and the access node;
    determining a synchronization time duration for completing a successful synchronization process between the wireless device and the access node;
    initiating a communication session between the wireless device and the access node;
    sending an unsolicited synchronization message by the access node to the wireless device during the communication session and after detecting a degradation of signal quality between the wireless device and the access node;
    starting the wireless device release timer after sending the unsolicited synchronization message;
    performing a second synchronization process;
    sending a success status synchronization response message by the access node to the wireless device;
    receiving a synchronization confirmation message at the access node from the wireless device, wherein the synchronization confirmation message comprises an identifier corresponding to the identity of the wireless device;
    modifying the wireless device release time interval based upon the synchronization time duration and a time duration for receiving a request for a wireless device context from a second access node; and
    canceling the wireless device release timer.

2. The method of claim 1 further comprising modifying the wireless device release time interval based upon the synchronization time duration.

3. The method of claim 1 further comprising performing a plurality of synchronization processes to establish the initial network connection over a wireless link.

4. The method of claim 1 further comprising receiving an initial synchronization request at an access node from a wireless device.

5. The method of claim 1, wherein the synchronization process comprises a ranging process.

6. The method of claim 1, wherein the synchronization process comprises is a random access channel (RACH) process.

7. The method of claim 1, wherein the synchronization process comprises communication in accordance with a wireless communication protocol.

8. The method of claim 7, wherein the wireless communication protocol comprises Worldwide Inter-operability for Microwave Access (WiMAX).

9. The method of claim 7, wherein the wireless communication protocol comprises Long Term Evolution (LTE).

10. A method of operating a communication system, comprising:
    determining a wireless device release time interval for a wireless device release timer at an access node after establishing an initial network connection between a wireless device and the access node, wherein the wireless device release timer is indicative of storing context information of the wireless device at the access node;
    performing an initial synchronization process between the wireless device and the access node after establishing the initial network connection;
    initiating a communication session between the wireless device and the access node;
    determining a synchronization time duration for completing a successful synchronization process between the wireless device and the access node;
    sending an unsolicited synchronization message from the access node to the wireless device during the communicate session and after detecting a degradation of signal quality between the wireless device and the access node;
    starting the wireless device release timer after sending the unsolicited synchronization message;
    performing a second synchronization process after sending the unsolicited synchronization message;
    sending a success status synchronization response message from the access node to the wireless device after performing the second synchronization process;
    receiving a synchronization confirmation message at the access node from the wireless device after sending the success status synchronization response message, wherein the synchronization confirmation message comprises an identifier corresponding to an identify of the wireless device;
    modifying the wireless device release time interval based upon the synchronization time duration and a time duration for receiving a request for a wireless device context from a second access node; and
    canceling the wireless device release timer after receiving the synchronization confirmation message.

11. The method of claim 10 further comprising modifying the wireless device release time internal based upon the synchronization time duration.

12. The method of claim 10 further comprising performing a plurality of synchronization process to establish the initial network connection over a wireless link.

13. The method of claim 10 further comprising receiving an initial synchronization request at an access node from a wireless device.

14. The method of claim 10, wherein the synchronization process comprises a ranging process.

15. The method of claim 10, wherein the synchronization process comprises in a random access channel (RACH) process.

* * * * *